United States Patent
Surnilla et al.

(10) Patent No.: US 9,797,323 B2
(45) Date of Patent: *Oct. 24, 2017

(54) METHODS AND SYSTEMS FOR HUMIDITY AND PCV FLOW DETECTION VIA AN EXHAUST GAS SENSOR

(71) Applicant: Ford Global Technologies, LLC, Dearborn, MI (US)

(72) Inventors: Gopichandra Surnilla, West Bloomfield, MI (US); Daniel A. Makled, Dearborn, MI (US); Richard E. Soltis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/818,646

(22) Filed: Aug. 5, 2015

(65) Prior Publication Data
US 2015/0337749 A1 Nov. 26, 2015

Related U.S. Application Data

(63) Continuation of application No. 14/037,249, filed on Sep. 25, 2013, now Pat. No. 9,109,523, which is a (Continued)

(51) Int. Cl.
*F02D 41/00* (2006.01)
*F02D 13/02* (2006.01)
(Continued)

(52) U.S. Cl.
CPC ......... *F02D 41/0055* (2013.01); *F01M 13/00* (2013.01); *F02D 13/0203* (2013.01); (Continued)

(58) Field of Classification Search
CPC .. F02D 13/00; F02D 13/0203; F02D 41/0005; F02D 41/0055; F02D 41/123;
(Continued)

(56) References Cited

U.S. PATENT DOCUMENTS

| 5,348,630 A | 9/1994 | Yagi et al. |
| 5,392,598 A | 2/1995 | White et al. |

(Continued)

FOREIGN PATENT DOCUMENTS

| CN | 101033706 A | 9/2007 |
| CN | 101482049 A | 7/2009 |
| | (Continued) | |
| CN | 101865010 A | 10/2010 |
| JP | 2007100631 A | 4/2007 |
| WO | 2009009902 A1 | 1/2009 |

OTHER PUBLICATIONS

State Intellectual Property Office of the People's Republic of China, Office Action and Search Report Issued in Application No. 201410019429.5, dated Jun. 14, 2017, 8 pages. (Submitted with Partial Translation).

*Primary Examiner* — Audrey K Bradley
(74) *Attorney, Agent, or Firm* — Julia Voutyras; McCoy Russell LLP

(57) ABSTRACT

Methods and systems are provided for estimating a PCV flow to an engine based on the output of an exhaust gas oxygen sensor. During DFSO conditions, a reference voltage of the sensor is modulated initially with an intake throttle open and then with the intake throttle closed. PCV flow leaking past the piston valves in an aging engine, as well as an ambient humidity estimate, are inferred based on the outputs of the sensor during the modulating with the intake throttle open and closed.

18 Claims, 7 Drawing Sheets

Related U.S. Application Data continuation-in-part of application No. 13/745,639, filed on Jan. 18, 2013, now Pat. No. 8,857,155.

(51) Int. Cl.

| | |
|---|---|
| *F01M 13/00* | (2006.01) |
| *G01M 15/10* | (2006.01) |
| *F02D 41/12* | (2006.01) |
| *F02D 41/14* | (2006.01) |

(52) U.S. Cl.
CPC ....... *F02D 41/0005* (2013.01); *F02D 41/123* (2013.01); *F02D 41/1456* (2013.01); *G01M 15/104* (2013.01); *F02D 2041/1472* (2013.01); *F02D 2250/08* (2013.01); *Y02T 10/42* (2013.01); *Y02T 10/47* (2013.01)

(58) Field of Classification Search
CPC ......... F02D 41/1456; F02D 2041/1472; F02D 2250/08; F01M 13/00; G01M 15/104; Y02T 10/42; Y02T 10/47
See application file for complete search history.

(56) References Cited

U.S. PATENT DOCUMENTS

| | | |
|---|---|---|
| 8,296,042 B2 | 10/2012 | Xiao et al. |
| 8,495,996 B2 | 7/2013 | Soltis et al. |
| 2008/0110238 A1 | 5/2008 | Kariya et al. |
| 2011/0132340 A1 | 6/2011 | Soltis |
| 2011/0132342 A1 | 6/2011 | Soltis et al. |
| 2014/0288804 A1 | 9/2014 | Pursifull |
| 2015/0075502 A1 | 3/2015 | Surnilla et al. |
| 2015/0075503 A1 | 3/2015 | Surnilla et al. |

METHODS AND SYSTEMS FOR HUMIDITY AND PCV FLOW DETECTION VIA AN EXHAUST GAS SENSOR

CROSS REFERENCE TO RELATED APPLICATIONS

The present application is a continuation of U.S. patent application Ser. No. 14/037,249, entitled "METHODS AND SYSTEMS FOR HUMIDITY AND PCV FLOW DETECTION VIA AN EXHAUST GAS SENSOR," filed Sep. 25, 2013, which is a continuation-in-part of U.S. patent application Ser. No. 13/745,639, entitled "METHODS AND SYSTEMS FOR HUMIDITY DETECTION VIA AN EXHAUST GAS SENSOR," filed on Jan. 18, 2013, now U.S. Pat. No. 8,857,155, the entire contents of each of which are hereby incorporated by reference for all purposes.

TECHNICAL FIELD

The present application relates generally to ambient humidity detection via an exhaust gas sensor coupled in an exhaust system of an internal combustion engine.

BACKGROUND AND SUMMARY

During engine non-fueling conditions in which at least one intake valve and one exhaust valve are operating, such as deceleration fuel shut off (DFSO), ambient air may flow through engine cylinders and into the exhaust system. In some examples, an exhaust gas sensor may be utilized to determine ambient humidity during the engine non-fueling conditions. However, due to intake throttle closure during the engine non-fueling condition, a large intake manifold vacuum is generated which can draw in positive crankcase ventilation (PCV) hydrocarbons. As such, even if a PCV port is closed during the DFSO, the vacuum may be sufficiently strong to draw in PCV hydrocarbons through the piston rings. The PCV flow drawn in may be aggravated in an aging engine due to leakage of PCV gases past the piston rings and valves. The ingested hydrocarbons affect the output of the exhaust gas sensor and can confound the humidity measurements. In particular, the hydrocarbon effect leads to a sensor output that overestimates the ambient humidity.

The inventors herein have recognized the above issue and have devised an approach to at least partially address it. Thus, a method for an engine system which includes an exhaust gas sensor is disclosed. In one example, the method includes, during engine non-fueling conditions, where at least one intake valve and one exhaust valve are operating, modulating a reference voltage of an exhaust gas sensor with an intake throttle closed and open; and indicating engine degradation based on PCV flow, the positive crankcase ventilation (PCV) flow based on outputs of the sensor during the modulating. The method may further comprise generating an indication of ambient humidity based on an output of the exhaust gas sensor with the intake throttle closed and the estimated PCV flow. In this way, a more accurate ambient humidity estimate may be achieved and PCV flow may be better estimated and accounted for.

For example, during selected deceleration fuel shut off (DFSO) events, an engine controller may modulate the reference voltage of an intake oxygen sensor to estimate each of an ambient humidity and a PCV flow. The controller may first modulate the reference voltage with the intake throttle open and then re-modulate the voltage with the intake throttle closed. With the intake throttle open, manifold pressure is increased and PCV flow to the intake is reduced. During such conditions, a change in pumping current read at the sensor during the modulating is indicative of an ambient humidity. With the intake throttle closed, manifold pressure is decreased and PCV flow to the intake is increased. During such conditions, a change in pumping current read at the sensor during the modulating is indicative of an ambient humidity as well as an effect of PCV hydrocarbons. By comparing the change in pumping currents estimated with the intake throttle open and closed, an amount of PCV flow received in the engine during closed throttle conditions can be identified. If the PCV port was also closed during the modulating, the PCV flow can be compared to a threshold to identify PCV flow leakage past piston rings and an indication of engine aging and component degradation can be signaled. The ambient humidity can also be further modified based on the learned PCV flow. The more reliable ambient humidity estimate, free of hydrocarbon effects from PCV, can then be used to adjust engine operating parameters without incurring engine control issues.

In this way, the PCV impact on humidity measurement by an exhaust gas oxygen sensor is reduced. By selectively opening the intake throttle during a DFSO when humidity measurement is required, intake manifold vacuum is reduced, lowering the amount of PCV hydrocarbons drawn into the engine. In addition, even if any PCV hydrocarbons are ingested, the increased airflow reduces the PCV concentration sensed by the exhaust gas sensor during the DFSO. As such, the ambient humidity may be determined more accurately and reliably.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
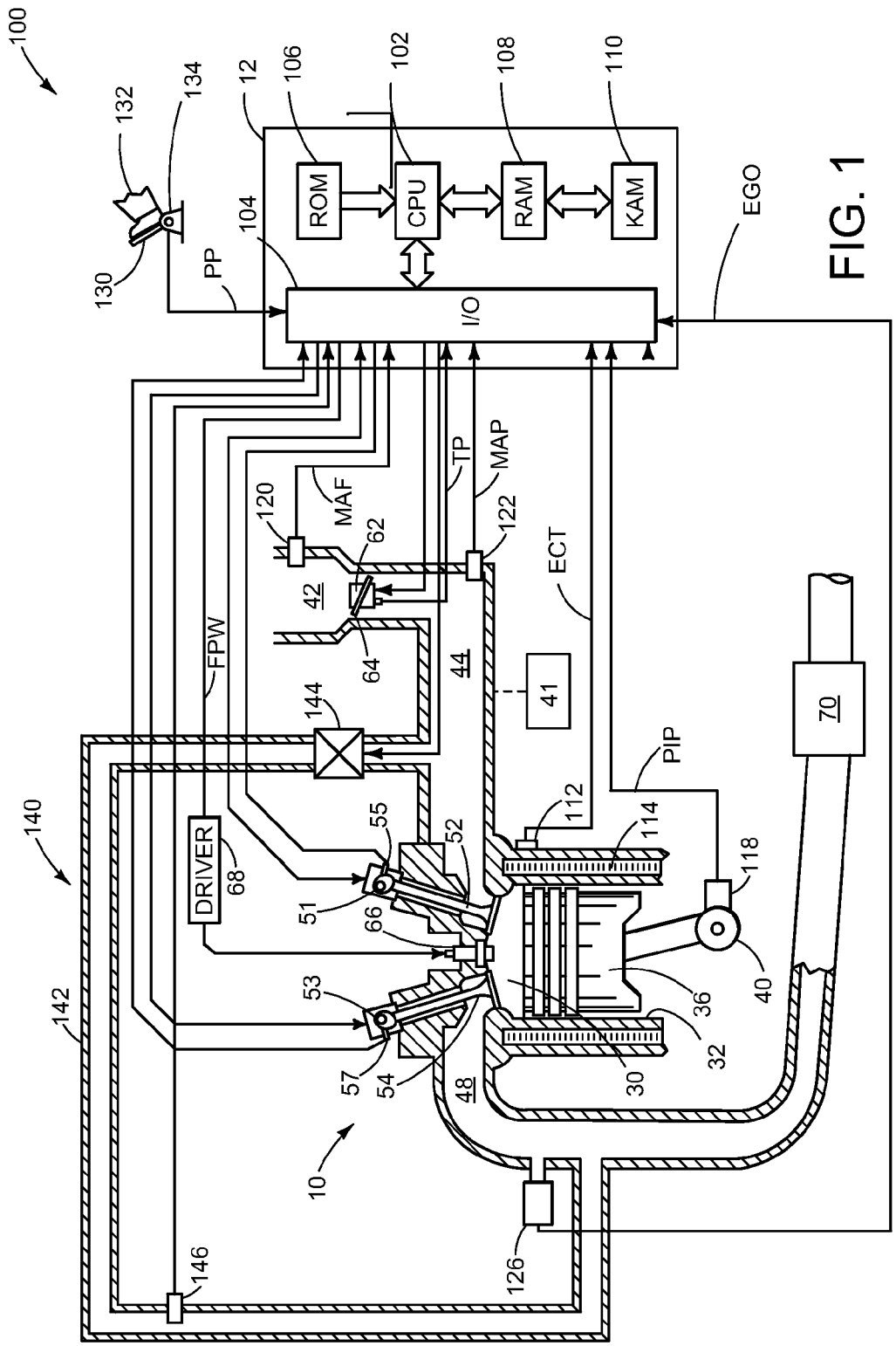
FIG. 1 shows an example embodiment of a combustion chamber in an engine system including an exhaust system and an exhaust gas recirculation system.
Figure 2:
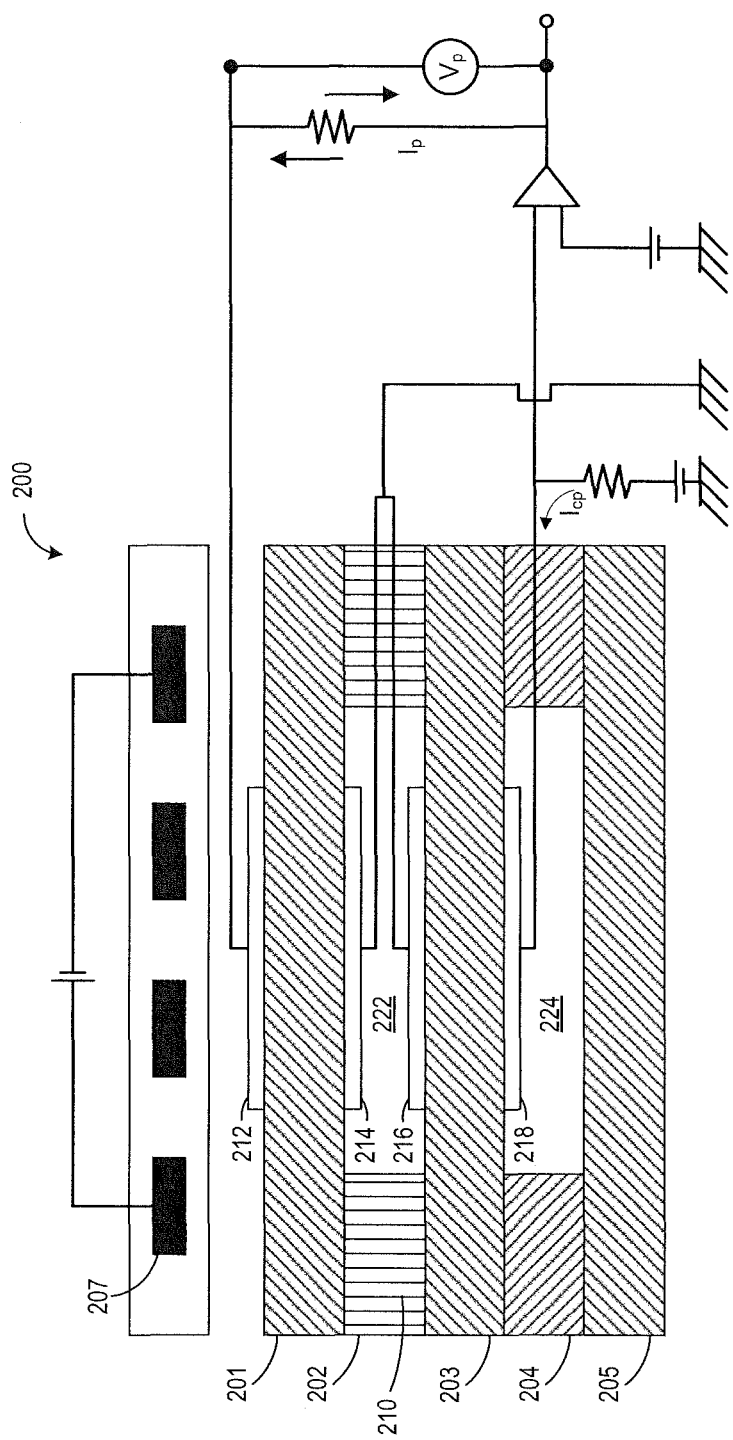
FIG. 2 shows a schematic diagram of an example exhaust gas sensor.

The following description relates to methods and systems for an engine system with an exhaust gas oxygen sensor, such as the engine system of FIG. 1 and the exhaust gas oxygen sensor of FIG. 2. During selected engine non-fueling conditions, the exhaust gas oxygen sensor may be used for humidity estimation and/or PCV flow estimation. A controller of the engine system may be configured with code to perform a control routine, such as the routines of FIGS. 3-4 to modulate a reference voltage applied to the exhaust gas oxygen sensor during the engine non-fueling conditions with an intake throttle open, and then again with the intake throttle closed. By comparing the outputs of the sensor during the modulating, the controller may learn the ambient humidity as well as a PCV flow rate. The learning may be based on the linear relationship between exhaust water content and a pumping current output by the sensor (FIG. 6). The controller may then adjust one or more engine operating parameters based on the learned humidity and PCV flow (FIG. 5). Furthermore, the controller may also identify engine component degradation leading to PCV leakage based on the learned PCV flow. An example adjustment is shown with reference to FIG. 7.

FIG. 1 is a schematic diagram showing one cylinder of a multi-cylinder engine 10 in an engine system 100, which may be included in a propulsion system of an automobile. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The intake passage 42 may include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The emission control device 70 is shown arranged along the exhaust passage 48 downstream of the exhaust gas sensor 126. The device 70 may be a three way catalyst (TWC), $NO_x$ trap, various other emission control devices, or combinations thereof. In some embodiments, during operation of the engine 10, the emission control device 70 may be periodically reset by operating at least one cylinder of the engine within a particular air/fuel ratio.

Further, in the disclosed embodiments, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

FIG. 2 shows a schematic view of an example embodiment of an exhaust gas sensor, such as a UEGO sensor 200 configured to measure a concentration of oxygen ($O_2$) in an exhaust gas stream. The sensor 200 may operate as the exhaust gas sensor 126 described above with reference to FIG. 1, for example. The sensor 200 comprises a plurality of layers of one or more ceramic materials arranged in a stacked configuration. In the embodiment of FIG. 2, five ceramic layers are depicted as layers 201, 202, 203, 204, and 205. These layers include one or more layers of a solid electrolyte capable of conducting ionic oxygen. Examples of suitable solid electrolytes include, but are not limited to, zirconium oxide-based materials. Further, in some embodiments such as that shown in FIG. 2, a heater 207 may be disposed in thermal communication with the layers to increase the ionic conductivity of the layers. While the depicted UEGO sensor 200 is formed from five ceramic layers, it will be appreciated that the UEGO sensor may include other suitable numbers of ceramic layers.

The layer 202 includes a material or materials creating a diffusion path 210. The diffusion path 210 is configured to introduce exhaust gases into a first internal cavity 222 via diffusion. The diffusion path 210 may be configured to allow one or more components of exhaust gases, including but not limited to a desired analyte (e.g., $O_2$), to diffuse into the internal cavity 222 at a more limiting rate than the analyte can be pumped in or out by pumping electrodes pair 212 and 214. In this manner, a stoichiometric level of $O_2$ may be obtained in the first internal cavity 222.

The sensor 200 further includes a second internal cavity 224 within the layer 204 separated from the first internal cavity 222 by the layer 203. The second internal cavity 224 is configured to maintain a constant oxygen partial pressure equivalent to a stoichiometric condition, e.g., an oxygen level present in the second internal cavity 224 is equal to that which the exhaust gas would have if the air-fuel ratio was stoichiometric. The oxygen concentration in the second internal cavity 224 is held constant by pumping current $I_{cp}$. Herein, the second internal cavity 224 may be referred to as a reference cell.

A pair of sensing electrodes 216 and 218 is disposed in communication with first internal cavity 222 and the reference cell 224. The sensing electrodes pair 216 and 218 detects a concentration gradient that may develop between the first internal cavity 222 and the reference cell 224 due to an oxygen concentration in the exhaust gas that is higher than or lower than the stoichiometric level. A high oxygen concentration may be caused by a lean exhaust gas mixture, while a low oxygen concentration may be caused by a rich mixture, for example.

The pair of pumping electrodes 212 and 214 is disposed in communication with the internal cavity 222, and is configured to electrochemically pump a selected gas constituent (e.g., $O_2$) from the internal cavity 222 through the layer 201 and out of the sensor 200. Alternatively, the pair of pumping electrodes 212 and 214 may be configured to electrochemically pump a selected gas through the layer 201 and into the internal cavity 222. Herein, the pumping electrodes pair 212 and 214 may be referred to as an $O_2$ pumping cell.

The electrodes 212, 214, 216, and 218 may be made of various suitable materials. In some embodiments, the electrodes 212, 214, 216, and 218 may be at least partially made of a material that catalyzes the dissociation of molecular oxygen. Examples of such materials include, but are not limited to, electrodes containing platinum and/or gold.

The process of electrochemically pumping the oxygen out of or into the internal cavity 222 includes applying an electric current $I_p$ across the pumping electrodes pair 212 and 214. The pumping current $I_p$ applied to the $O_2$ pumping cell pumps oxygen into or out of the first internal cavity 222 in order to maintain a stoichiometric level of oxygen in the cavity pumping cell. The pumping current $I_p$ is proportional to the concentration of oxygen in the exhaust gas. Thus, a lean mixture will cause oxygen to be pumped out of the internal cavity 222 and a rich mixture will cause oxygen to be pumped into the internal cavity 222.

A control system (not shown in FIG. 2) generates the pumping voltage signal $V_p$ as a function of the intensity of the pumping current $I_p$ required to maintain a stoichiometric level within the first internal cavity 222.

As such, the exhaust gas oxygen sensor is operated at a first, lower reference voltage (Vs), such as 450 mV. However, when the voltage is changed to a second, higher reference voltage, such as higher than 800 mV (e.g., 1080 mV), the sensor dissociates water in the exhaust gas and measures the additional oxygen from the water. This phenomenon can then be advantageously used to measure ambient humidity. Specifically, when operated at the lower reference voltage (450 mV), the pumping current is proportional to the oxygen concentration [$O_2$]. Then, when the sensor is operated at the higher reference voltage (1080 mV), additional oxygen is liberated due to the dissociation of water ($H_2O$->$H_2+\frac{1}{2}O_2$) and the change in pumping current corresponding to the excess oxygen is measured to determine the water concentration [$H_2O$]. As shown at plot 600 of FIG. 6, the pumping current (Ip, along the y-axis) varies linearly with the water concentration ([$H_2O$], along the x-axis). The relationship may be defined by the equation:

$$Ip=0.114[H_2O]mA5-0.00011\ mA$$

A linear regression fit of the plot of FIG. 6 provides a regression coefficient $R^2$ of 0.999. At the higher reference voltage of 1080 mV, the sensor resolution is in the order of 2 μA.

It should be appreciated that the UEGO sensor described herein is merely an example embodiment of a UEGO sensor, and that other embodiments of UEGO sensors may have additional and/or alternative features and/or designs.

The exhaust gas oxygen sensor, however, is affected by the presence of hydrocarbons in exhaust air. Specifically, exhaust hydrocarbons may be oxidized to carbon dioxide and water at the sensor, causing the sensing element of the exhaust gas oxygen sensor to read a lower amount of oxygen than actually present. As such, this causes ambient humidity estimated based on the output of the UEGO to be incorrect (e.g., the ambient humidity is overestimated). While this issue may be somewhat addressed by measuring the amount of water in the air during a DFSO conditions when the engine is not fueled, the measurement may nonetheless be affected by the presence of hydrocarbons ingested from the PCV port. These include blow-by gas and positive crankcase ventilation (PCV) hydrocarbons. Even if the PCV port is shut off (e.g., by closing a PCV valve), PCV hydrocarbons may be ingested through the piston rings. For example, while an intake throttle is open during the DFSO condition, the intake MAP may be low enough to draw in PCV hydrocarbons. The problem may be exacerbated in aging engines where additional PCV leakage may be due to degradation of piston rings and valves. The increased PCV increases engine oil consumption, loss of peak torque, and affects the output of the humidity sensor. As such, to control the PCV flow and to identify any major deterioration in engine components, it is required to monitor the PCV flow. However, there is no robust mechanism currently available to determine the PCV flow and/or determine the PCV content.

Figure 3:
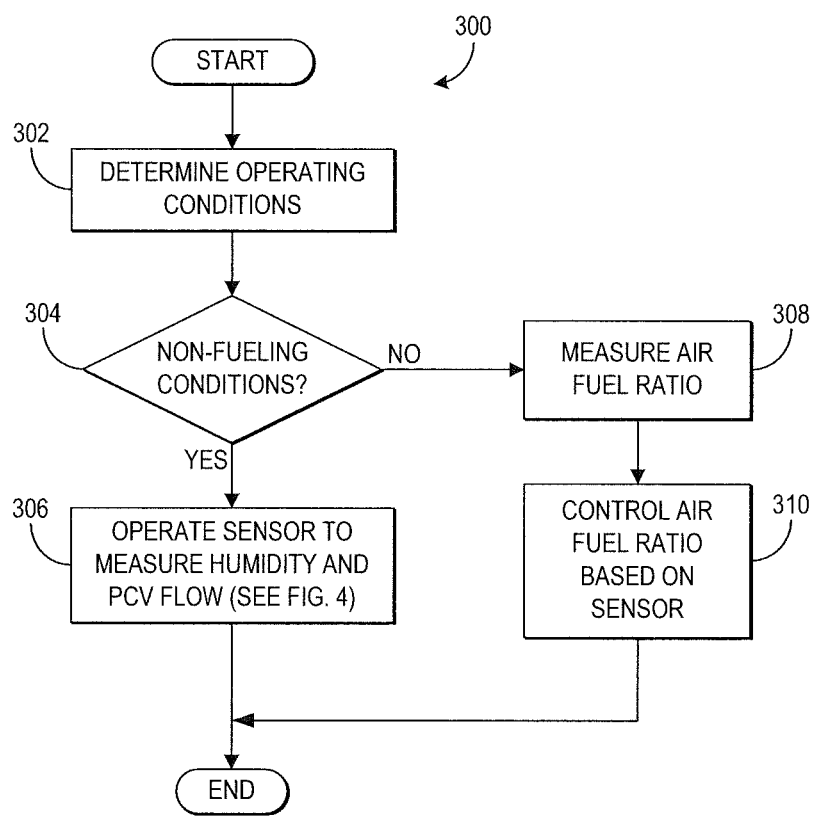
FIG. 3 is a flow chart illustrating a routine for determining a measurement mode of an exhaust gas sensor.
Figure 4:
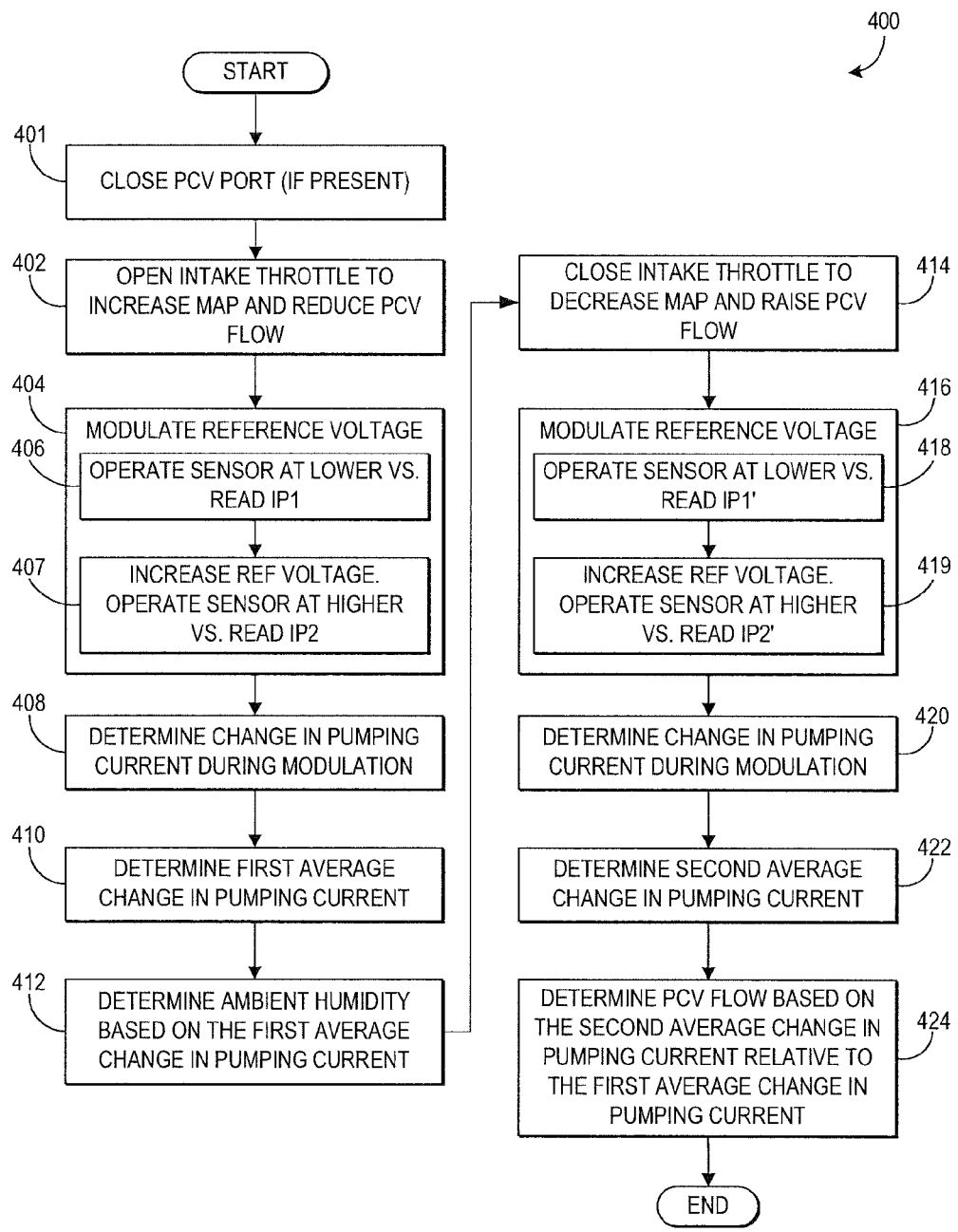
FIG. 4 is a flow chart illustrating a routine for determining ambient humidity based on an exhaust gas sensor.
Figure 5:
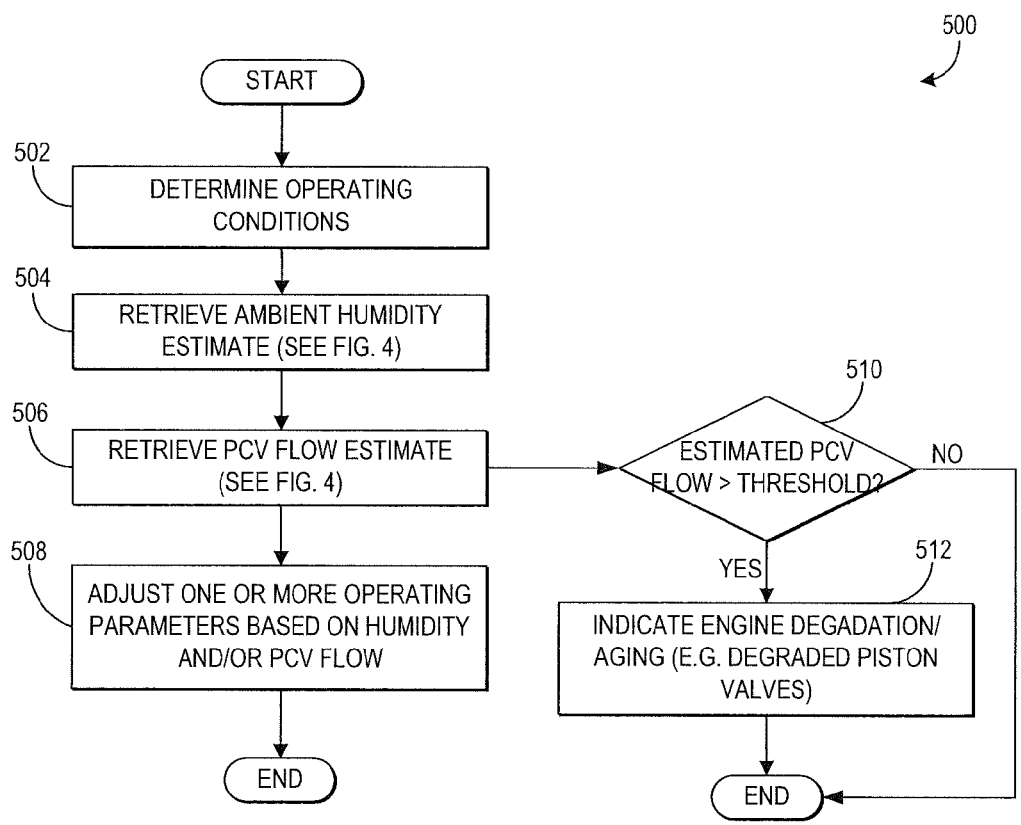
FIG. 5 shows a graph illustrating effect of PCV hydrocarbons on humidity estimation.
Figure 6:
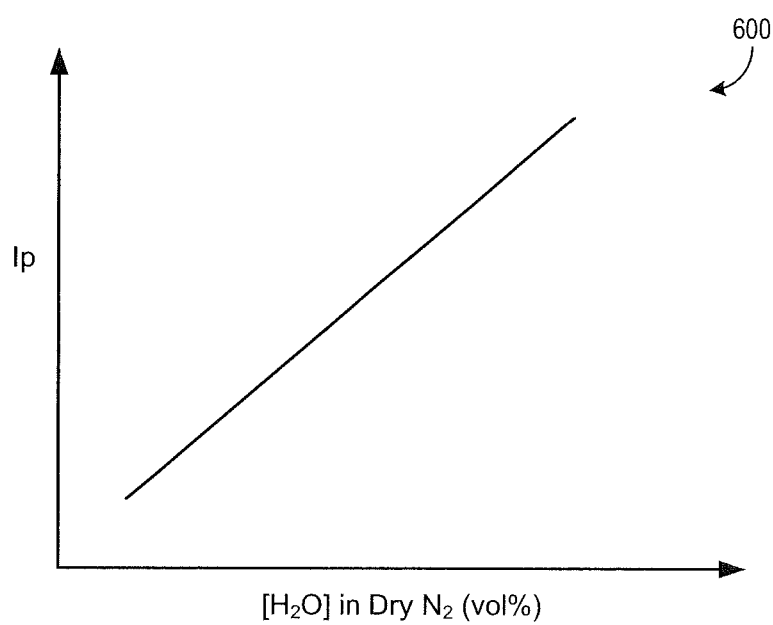
FIG. 6 is a flow chart illustrating a routine for adjusting engine operating parameters based on an ambient humidity generated by an exhaust gas sensor.

As elaborated with reference to FIGS. 3-5, the inventors herein have recognized that the impact of the PCV hydrocarbons can be minimized, or even eliminated, by opening the intake throttle during DFSO events while the humidity is being estimated by the exhaust gas oxygen sensor. By opening the intake throttle, the manifold pressure can be increased. This reduces the delta pressure across the PCV port, thereby reducing the amount of PCV flow drawn into the intake manifold. The increased MAP also increases the pressure in the cylinder, reducing the hydrocarbon (or oil) flow across the piston rings into the cylinder air. Further, the increased MAP increases the airflow during the DFSO event, reducing the oil or hydrocarbon vapor concentration. The combined effect reduces the overall impact of PCV flow on the exhaust gas sensor's measurement of oxygen from the dissociated ambient humidity water.

In addition, while estimating the ambient humidity, the same exhaust gas sensor can be advantageously used to estimate the PCV flow of the engine and identify engine component degradation leading to PCV flow leakage. Specifically, the reference voltage of the exhaust gas oxygen sensor may be modulated during DFSO events with the intake valve open and then with the intake valve closed, and the delta Ip at both conditions may be compared to estimate the PCV flow amount. Engine operating parameters may then be adjusted based on the more accurate estimate of ambient humidity and PCV flow.

FIGS. 3-5 show flow charts illustrating routines for an exhaust gas sensor and an engine system, respectively. For example, the routine shown in FIG. 3 determines whether the sensor should be operated to measure exhaust gas oxygen concentration or ambient humidity or PCV flow based on fueling conditions of the engine. The routine shown in FIG. 4 determines the ambient humidity and PCV flow amount based on the exhaust gas sensor 200 described with reference to FIG. 2. FIG. 5 shows a routine for adjusting an engine operating parameter based on the ambient humidity and PCV flow determined via the routine shown in FIG. 3. In addition, the routine of FIG. 5 allows engine component degradation to be identified based on PCV flow amount relative to a threshold.

Now turning to FIG. 3, a flow chart illustrating a routine 300 is shown for controlling an exhaust gas sensor, such as the exhaust gas oxygen sensor described above with reference to FIG. 2 and positioned as shown in FIG. 1. The mode of operation of the sensor is controlled based at least on engine fueling conditions. Specifically, the routine determines if the engine system is operating under non-fueling conditions and adjusts a measurement mode of the sensor accordingly. For example, during non-fueling conditions, the sensor is operated in a mode to determine ambient humidity and/or PCV flow while during fueling conditions, the sensor is operated in a mode to measure exhaust gas oxygen concentration to determine air fuel ratio.

At 302 of routine 300 in FIG. 3, engine operating conditions are determined. As non-limiting examples, the engine operating conditions may include actual/desired amount of EGR, spark timing, air-fuel ratio, engine speed, barometric pressure, engine coolant temperature, etc.

Once the operating conditions are determined, it is determined if the engine is under non-fueling conditions at 304 of routine 300. Non-fueling conditions include engine operating conditions in which the fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake passage to the exhaust passage. In this way, a sensor, such as an exhaust gas oxygen sensor, may receive ambient air on which measurements, such as ambient humidity detection, may be performed.

Non-fueling conditions may include, for example, deceleration fuel shut off (DFSO). DFSO is responsive to the operator pedal (e.g., in response to a driver tip-out and where the vehicle accelerates greater than a threshold amount). DAFOE conditions may occur repeatedly during a drive cycle, and, thus, numerous indications of the ambient humidity may be generated throughout the drive cycle, such as during each DFSO event. As such, the overall efficiency of the engine may be maintained during driving cycles in which the ambient humidity fluctuates. The ambient humidity may fluctuate due to a change in altitude or temperature or when the vehicle enters/exits fog or rain, for example.

If it is determined that the engine is not operating under non-fueling conditions, for example, fuel is injected in one or more cylinders of the engine, routine 300 moves to 308. At 308, the exhaust gas sensor is operated as an air-fuel ratio sensor. In this mode of operation, the sensor may be operated as a lambda sensor, for example. As a lambda sensor, the output voltage may determine whether the exhaust gas air-fuel ratio is lean or rich. Alternatively, the sensor may operate as a universal exhaust gas oxygen sensor (UEGO) and an air-fuel ratio (e.g., a degree of deviation from a stoichiometric ratio) may be obtained from the pumping current of the pumping cell of the sensor.

At 310 of routine 300, the air-fuel ratio (FAR) is controlled responsive to the exhaust gas oxygen sensor. Thus, a desired exhaust gas FAR may be maintained based on feedback from the sensor during engine fueling conditions. For example, if a desired air-fuel ratio is the stoichiometric ratio and the sensor determines the exhaust gas is lean (i.e., the exhaust gas comprises excess oxygen and the FAR is less than stoichiometric), additional fuel may be injected during subsequent engine fueling operation. As another example, if a desired air-fuel ratio is the stoichiometric ratio and the sensor determines the exhaust gas is rich (i.e., the exhaust gas comprises excess fuel and the FAR is more than stoichiometric), fuel injection may be reduced during subsequent engine fueling operation.

On the other hand, if it is determined that the engine is under non-fueling conditions, the routine proceeds to 306, and the sensor is operated to determine ambient humidity and/or PCV flow to the engine. The ambient humidity and the PCV flow may be determined based on the sensor output, as described in greater detail below with reference to FIG. 4. For example, a reference voltage of the sensor may be modulated between a minimum voltage at which oxygen is detected and a voltage at which water molecules may be dissociated such that the ambient humidity may be determined. The process may be repeated with the intake throttle open (where PCV flow is reduced or eliminated) as well as the intake throttle closed (where PCV flow is enabled) and the difference in sensor outputs at the two throttle conditions may be used to infer PCV flow. It should be understood, the ambient humidity as determined (described below with reference to FIG. 4) is the absolute ambient humidity. Additionally, relative humidity may be obtained by further employing a temperature detecting device, such as a temperature sensor.

FIG. 4 shows a flow chart illustrating a routine 400 for determining ambient humidity and PCV flow via an exhaust gas sensor, such as the oxygen sensor described above with reference to FIG. 2, and positioned as shown in FIG. 1, for example.

At 401, the routine includes closing a PCV port 41. For example, if a PCV valve coupling the engine crankcase to the intake manifold is present, the valve may be closed. By closing the valve, ingestion of PCV hydrocarbons is reduced, and their effect on the output of the exhaust gas oxygen sensor is minimized.

At 402, the routine includes opening an intake throttle to increase the manifold pressure (MAP) and thereby reduce the drawing in of PCV flow past piston rings. Opening the intake throttle includes fully opening the intake throttle in one example. In another example, the intake throttle may be opened by at least 15 degrees. As discussed previously, by opening the intake throttle, the impact of PCV flow (such as any PCV flow leaking past the piston rings) is reduced. This is due to the increase in MAP causing a drop in delta pressure across the PCV port, which reduces the amount of PCV flow into the intake manifold. The increased MAP also increases the cylinder pressure which reduces the flow of PCV hydrocarbons across the piston rings into the cylinder air. Finally, the increased MAP also increases the overall airflow during the DFSO event, reducing the effective hydrocarbon vapor concentration.

At 404, the routine includes, with the intake throttle open, modulating a reference voltage of the exhaust gas sensor. Herein, the exhaust gas sensor is an exhaust gas oxygen sensor. Modulating the reference voltage includes switching the reference voltage between a first, lower reference voltage and a second, higher reference voltage. Specifically, at 406, the sensor is operated at the lower reference voltage and a first pumping current output by the sensor (IP1) is read. Then, at 408, the reference voltage is increased, the sensor is operated at the higher reference voltage, and a second pumping current output by the sensor (IP2) is read. As one non-limiting example, the first voltage may be 450 mV and the second voltage may be 1080 mV. With the intake throttle open, at 450 mV, for example, the first pumping current (IP1=Ip_450_no_pcv) may be indicative of an amount of oxygen in the exhaust gas. At 1080 mV, water molecules may be dissociated such that the second pumping current is indicative of the amount of oxygen in the exhaust gas plus an amount of oxygen from dissociated water molecules (IP2=Ip_1080_no_pcv). The first voltage may be a voltage at which a concentration of oxygen in the exhaust gas may be determined, for example, while the second voltage may be a voltage at which water molecules may be dissociated.

As such, at 1080 mV, carbon dioxide ($CO_2$) molecules may be dissociated in addition to water molecules. However, during conditions when the intake throttle is open, and the engine is not fueled, carbon dioxide from hydrocarbon (e.g., fuel or oil) oxidation may not be generated and therefore may not affect the humidity estimation.

At 408, the routine includes determining a change in pumping current (delta Ip) during the modulation. At 410, an average change in pumping current may be determined. For example, during the DFSO event with the intake throttle open, the modulating may be performed for a duration, and a change in pumping current at each modulation may be learned. Then, the learned values may be averaged. As such, since this delta Ip is based on sensor output read with the intake throttle open, the delta Ip represents the change in pumping current from ambient humidity only (without any contribution from PCV flow). Thus, this first change in pumping current may be stored as Delta_ip_no_pcv and may be learned as:

Delta_$ip\_no$_pcv=$Ip\_1080\_no$_pcv−$Ip\_450\_no$_pcv=$IP2-IP1$

By modulating the reference voltage and determining an average change in pumping current, the effect of a changing air fuel ratio at the beginning of a fuel shut off duration when residual combustion gases may be present in the exhaust may be nullified, for example. As such, an indication of ambient humidity may be generated relatively quickly after fuel injection is suspended, even if the exhaust gas is not free of residual combustion gases.

At 412, an ambient humidity may be estimated based on the first change in pumping current (Delta_ip_no_pcv). Specifically, since the pumping current output by the sensor at the second voltage (where water molecules are dissociated) is indicative of the amount of oxygen in the exhaust gas plus an amount of oxygen from dissociated water molecule, while the first pumping current output by the sensor at the first voltage (where water molecules are not dissociated) is indicative of the amount of oxygen in the exhaust gas, the first change in pumping current (difference between first pumping current and second pumping current with intake throttle open) estimated during the engine non-fueling condition where at least one intake valve and one exhaust valve is operating is indicative of the ambient humidity.

It will be appreciated that in some examples, modulating of the reference voltage for determination of ambient humidity may be based on the duration of the fuel shut off. For example, the routine may optionally determine a duration since fuel shut off. If the duration since fuel shut off is less than a threshold duration, the reference voltage of the sensor is modulated between the first voltage and the second voltage in order to determine the ambient humidity. When the duration since fuel shut off is greater than the threshold duration, the reference voltage is not modulated. In some examples, the duration since fuel shut off may be a time since fuel shut off. In other examples, the duration since fuel shut off may be a number of engine cycles since fuel shut off. As such, the threshold duration may be an amount of time until the exhaust is substantially free of hydrocarbons from combustion in the engine. For example, residual gases from one or more previous combustion cycles may remain in the exhaust for several cycles after fuel is shut off and the gas that is exhausted from the chamber may contain more than ambient air for a duration after fuel injection is stopped. Further, the period in which fuel is shut off may vary. For example, a vehicle operator may release the accelerator pedal and coast to a stop, resulting in a long DFSO period. In some situations, the fuel shut off period (the time from interruption of the fuel supply to restart of the fuel supply, for example) may not be long enough for the ambient air to establish an equilibrium state in the exhaust system. For example, a vehicle operator may tip-in shortly after releasing the accelerator pedal, causing DFSO to stop soon after beginning. In such a situation, the controller may modulate the reference voltage, as discussed at 404. In comparison, if the duration since fuel shut off is greater than the threshold duration, the reference voltage is increased to a threshold voltage, but not modulated. The threshold voltage may be a voltage at which a desired molecule is dissociated, such as the second, higher reference voltage of 1080 mV. In another example, during humidity estimation only (not PCV flow estimation), the second, higher reference voltage used may be 950 mV or another voltage at which water molecules may be dissociated.

Returning to routine 400, after estimating the ambient humidity, at 414, the routine includes closing the intake throttle to decrease the manifold pressure (MAP) and thereby raise the drawing in of PCV flow past piston rings into the engine intake manifold. Closing the intake throttle includes fully closing the intake throttle. As such, by closing the intake throttle, the impact of PCV flow is increased.

Next, at 416, with the intake throttle closed, the reference voltage of the exhaust gas oxygen sensor is modulated. As discussed with reference to 404, modulating the reference voltage includes switching the reference voltage between the first, lower reference voltage (e.g., 450 mV) and the second, higher reference voltage (e.g., 1080 mV). Specifically, at 418, the sensor is operated at the lower reference voltage and a first pumping current output by the sensor ($IP1'=Ip\_450\_w\_pcv$) is read. Then, at 419, the reference voltage is increased, the sensor is operated at the higher reference voltage, and a second pumping current output by the sensor ($IP2'=Ip\_1080\_w\_pcv$) is read. With the intake throttle closed, at 450 mV, for example, the pumping current may be indicative of an amount of oxygen in the exhaust gas. With the throttle closed, at 1080 mV, carbon dioxide ($CO_2$) molecules may be dissociated in addition to water molecules. Specifically, during conditions when the intake throttle is closed, and the engine is not fueled, carbon dioxide from hydrocarbon (e.g., fuel or oil) oxidation may be generated and may therefore affect the humidity estimation. Thus, at 1080 mV, water molecules and carbon dioxide molecules may be dissociated such that the pumping current is indicative of the amount of oxygen in the exhaust gas plus an amount of oxygen from dissociated water molecules plus an amount of oxygen from dissociated carbon dioxide ($CO_2$) molecules. The $CO_2$ is generated from the PCV hydrocarbons reacting with oxygen at the sensing element of the exhaust gas oxygen sensor to generate $CO_2$ and water.

At 420, the routine includes determining a change in pumping current (delta Ip) during the modulation. At 422, an average change in pumping current may be determined. For example, during the DFSO event with the intake throttle closed, the modulating may be performed for a duration, and a change in pumping current at each modulation may be learned. Then, the learned values may be averaged. As such, since this delta Ip is based on sensor output read with the intake throttle closed, the delta Ip represents the change in pumping current from ambient humidity with additional contribution from PCV flow. Thus, this second change in pumping current may be stored as Delta_ip_w_pcv and learned as:

$$\text{Delta}\_ip\_w\_pcv = Ip\_1080\_w\_pcv - Ip\_450\_w\_pcv = IP2' - IP1'$$

At 424, PCV flow may be estimated based on outputs of the exhaust gas oxygen sensor during the modulating with the intake throttle open and closed. Specifically, PCV flow rate (at closed throttle conditions) is estimated based on (e.g., as a function of) a difference between the first change in pumping current output by the sensor during the modulating with the intake throttle open (Delta_ip_no_pcv, as determined at 408) and the second change in pumping current output by the sensor during the modulating with the intake throttle closed (Delta_ip_w_pcv, as determined at 422). In other words, PCV flow may be determined as per the equation:

$$\text{PCV\_flow} = f(\text{Delta}\_ip\_w\_pcv - \text{Delta}\_ip\_no\_pcv)$$

wherein $f$ = function of

As elaborated with reference to FIG. 5, an engine controller may then indicate engine degradation (e.g., engine component degradation) based on the estimated PCV flow. Further, the controller may adjust an engine operating parameter based on the indication of ambient humidity (as learned at 412) and the estimated PCV flow (as learned at 424).

It will be appreciated that in some embodiments, the indication of ambient humidity may be generated based on the output of the sensor with the intake throttle open and further based on the estimated PCV flow.

In this way, the controller may first modulate the reference voltage of the exhaust gas sensor between the first, lower voltage and the second, higher voltage with the intake throttle open, and then close the intake throttle and modulate the reference voltage again between the first and second voltages with the intake throttle closed. The controller may then estimate an ambient humidity based on the outputs of the sensor during the modulating with the intake throttle open while estimating the PCV flow based on the outputs of the sensor during the modulating with the intake throttle open relative to the outputs of the sensor during the modulating with the intake throttle closed.

As described in detail above, an exhaust gas sensor may be operated in various modes in which the pumping voltage or pumping current of the pumping cell is monitored. As such, the sensor may be employed to determine the absolute ambient humidity of the air surrounding the vehicle, the PCV flow through the engine, as well as the air-fuel ratio of the exhaust gas. Subsequent to detection of the ambient humidity, the PCV flow, and the air-fuel ratio, a plurality of engine operating parameters may be adjusted for optimal engine performance, which will be explained in detail below. These parameters include, but are not limited to, an amount of exhaust gas recirculation (EGR), spark timing, air-fuel ratio, fuel injection, and valve timing. In one embodiment, one or more of these operating parameters (e.g., EGR, spark timing, air-fuel ratio, fuel injection, valve timing, etc.) are not adjusted during the modulating of the reference voltage of the exhaust gas sensor.

FIG. 5 shows a flow chart illustrating a routine 500 for adjusting engine operating parameters based on an ambient humidity generated by an exhaust gas sensor, such as the ambient humidity generated as described with reference to FIG. 4, for example. The engine operating parameters may be further adjusted based on the estimated PCV flow. For example, an increase in water concentration of the air surrounding the vehicle may dilute a charge mixture delivered to a combustion chamber of the engine. If one or more operating parameters are not adjusted in response to the increase in humidity, engine performance and fuel economy may decrease and emissions may increase; thus, the overall efficiency of the engine may be reduced. As another example, the presence of PCV flow into the engine may increase the fuel content of the air entering the cylinders. If cylinder fuel injection is not adjusted in response to the increase in fuel, engine performance and fuel economy may decrease and emissions may increase; thus, the overall efficiency of the engine may be reduced.

At 502, engine operating conditions are determined. The engine operating conditions may include EGR, spark timing, and air fuel ratio, among others, which may be affected by fluctuations of the water concentration in ambient air.

Once the operating conditions are determined, the routine proceeds to 504 where the ambient humidity estimated learned during the routine of FIG. 4 is retrieved. Once the ambient humidity is retrieved, the routine continues to 506 where the PCV flow amount learned during the routine of FIG. 4 is retrieved. At 508, upon retrieving both the PCV flow and the ambient humidity estimate, one or more operating parameters are adjusted based on the estimated ambient humidity and the PCV flow. Such operating parameters may include an amount of EGR, spark timing, and air-fuel ratio, among others. As described above, in internal combustion engines, it is desirable to schedule engine operating parameters, such as spark timing, in order to optimize engine performance. In addition, engine control functions that are impacted by ambient humidity are adjusted. These may include, for example, spark compensation (e.g., spark compensation factors), condensation models (e.g., condensation modeling coefficients), as well as humidity sensor diagnostics (e.g., thresholds for humidity sensor OBD routines). Engine operating parameters affected by PCV flow may include, for example, fuel injection amounts. In some embodiments, only one parameter may be adjusted responsive to the humidity and PCV flow. In other embodiments, any combination or sub-combination of these operating parameters may be adjusted in response to measured fluctuations in ambient humidity.

In one example embodiment, an amount of EGR may be adjusted based on the measured ambient humidity. For example, in one condition, the water concentration in the air surrounding the vehicle may have increased due to a weather condition such as fog; thus, a higher humidity is detected by the exhaust gas sensor during engine non-fueling conditions. In response to the increased humidity measurement, during subsequent engine fueling operation, the EGR flow into at least one combustion chamber may be reduced. As a result, engine efficiency may be maintained.

Responsive to a fluctuation in absolute ambient humidity, EGR flow may be increased or decreased in at least one combustion chamber. As such, the EGR flow may be increased or decreased in only one combustion chamber, in some combustion chambers, or in all combustion chambers. Furthermore, the magnitude of change of the EGR flow may be the same for all cylinders or the magnitude of change of the EGR flow may vary by cylinder based on the specific operating conditions of each cylinder.

In another embodiment, spark timing may be adjusted responsive to the ambient humidity. In at least one condition, for example, spark timing may be advanced in one or more cylinders during subsequent engine fueling operation responsive to a higher humidity reading. Spark timing may be scheduled so as to reduce knock in low humidity conditions (e.g., retarded from a peak torque timing), for example. When an increase in humidity is detected by the exhaust gas sensor, spark timing may be advanced in order to maintain engine performance and operate closer to or at a peak torque spark timing.

Additionally, spark timing may be retarded in response to a decrease in ambient humidity. For example, a decrease in ambient humidity from a higher humidity may cause knock. If the decrease in humidity is detected by the exhaust gas sensor during non-fueling conditions, such as DFSO, spark timing may be retarded during subsequent engine fueling operation and knock may be reduced.

It should be noted that spark may be advanced or retarded in one or more cylinders during subsequent engine fueling operation. Further, the magnitude of change of spark timing may be the same for all cylinders or one or more cylinders may have varying magnitudes of spark advance or retard.

In still another example embodiment, exhaust gas air fuel ratio may be adjusted responsive to the measured ambient humidity during subsequent engine fueling operation. For example, an engine may be operating with a lean air fuel ratio optimized for low humidity. In the event of an increase in humidity, the mixture may become diluted, resulting in engine misfire. If the increase in humidity is detected by the exhaust gas sensor during non-fueling conditions, however, the air fuel ration may be adjusted so that the engine will operate with a less lean, lean air fuel ratio during subsequent fueling operation. Likewise, an air fuel ratio may be adjusted to be a more lean, lean air fuel ratio during subsequent engine fueling operation in response to a measured decrease in ambient humidity. In this way, conditions such as engine misfire due to humidity fluctuations may be reduced.

In some examples, an engine may be operating with a stoichiometric air fuel ratio or a rich air fuel ratio. As such, the air fuel ratio may be independent of ambient humidity and measured fluctuations in humidity may not result in an adjustment of air fuel ratio.

In yet another embodiment, fuel injection may be adjusted responsive to the PCV flow with the fuel injection during subsequent engine fueling conditions (that is, engine fueling conditions following the DFSO event where the humidity and PCV flow was learned) decreased as the PCV flow is increased.

From 506, the routine may also move to 510-512 to identify engine component degradation based on the estimated PCV flow. Specifically, at 510, the estimated PCV flow may be compared to a threshold. The threshold may be based on PCV flow levels measured during known engine degradation. Alternatively, the threshold may be based on a change in air-fuel ratio modeled based on the PCV flow. At 512, the routine includes indicating engine degradation based on the estimated PCV flow being higher than the threshold. Indicating engine degradation may include indicating degradation of engine components such as piston rings or valves. As such, if the estimated PCV flow is not higher than the threshold, no degradation may be determined and the routine may end.

In some embodiments, in response to the indication of degradation, a diagnostic code may be set. One or more engine operating parameters may optionally be further adjusted based on the indication. For example, an amount of EGR may be reduced based on the estimated PCV flow being higher than the threshold.

In one example, an engine method includes, during a first engine non-fueling condition, opening an intake throttle, modulating a reference voltage of an exhaust gas oxygen sensor, and learning a first change in sensor output during the modulating. Then, during a second engine non-fueling condition, the method includes closing the intake throttle, modulating the reference voltage of the exhaust gas oxygen sensor, and learning a second change in sensor output during the modulating. The method then generates an indication of PCV flow based on the first change relative to the second change. Herein, the first change in sensor output is a first change in pumping current output by the sensor during the modulating with the intake throttle open, while the second change in sensor output is a second change in pumping current output by the sensor during the modulating with the intake throttle closed. The method further includes generating an indication of ambient humidity based on the first change but not the second change in sensor output.

Further, the first change may be a first average change wherein generating an indication of ambient humidity based on the first change during the first non-fueling condition includes generating a change in pumping current for each modulation, averaging the change in pumping current, and generating an indication of ambient humidity based on the average of the change in pumping current.

The method further includes, during an engine fueling condition following the first and second engine non-fueling conditions, adjusting an engine operating parameter based on each of the indication of ambient humidity and the indication of PCV flow, the engine operating parameter including one or more of an amount of exhaust gas recirculation, spark timing, fuel injection amount, and engine air fuel ratio. As such, during each of the first and second engine non-fueling conditions, a port coupling an engine crankcase to the intake manifold is closed. Furthermore, piston valve degradation is indicated in response to the indication of PCV flow being higher than a threshold.

Figure 7:
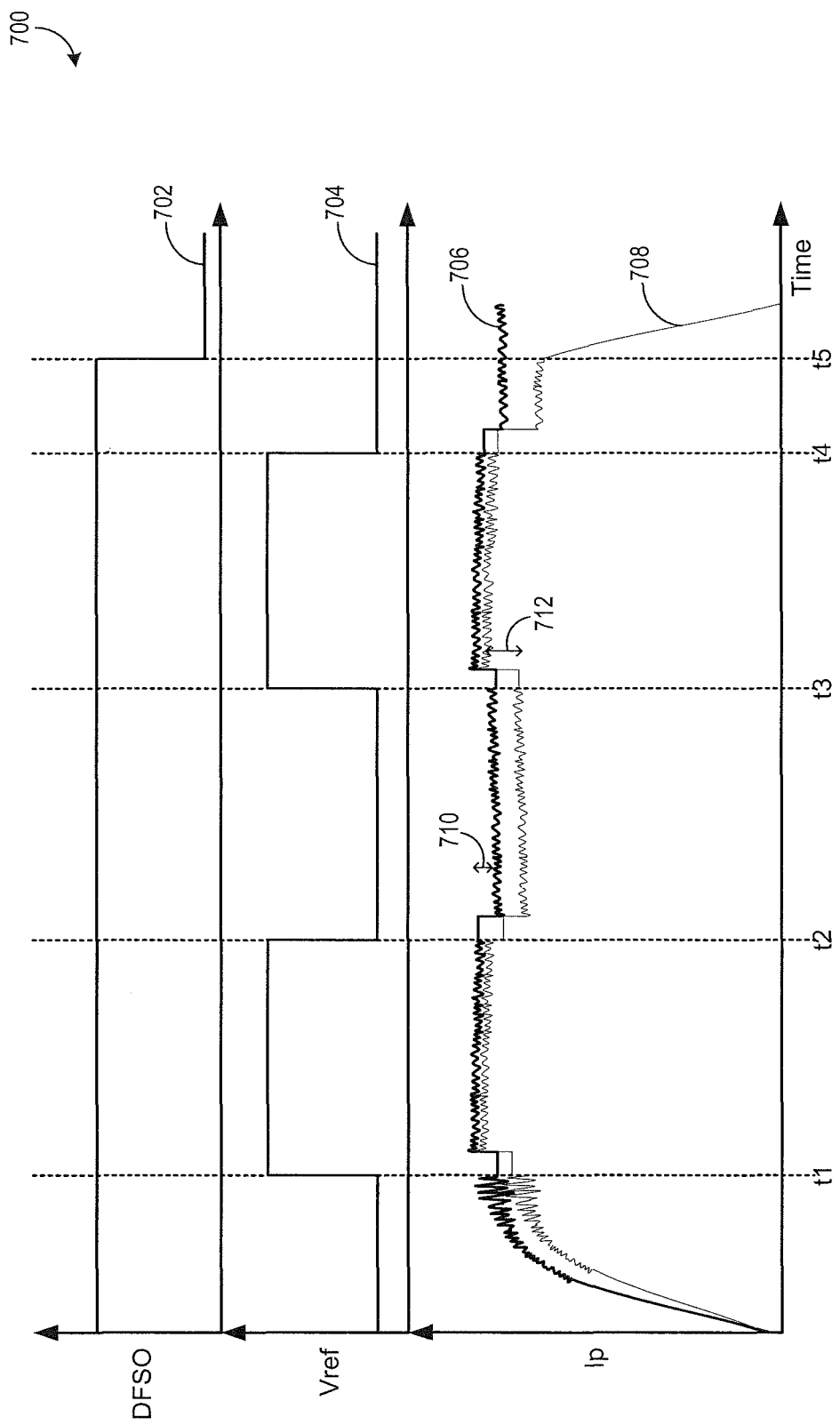
FIG. 7 shows an example impact of PCV flow on humidity determination.

Now turning to FIG. 7, the impact of PCV flow on humidity determination is shown. In particular, map 700 shows an example change in pumping current of an exhaust gas oxygen sensor at different reference voltages. Map 700 depicts DFSO conditions at plot 702, a reference voltage applied to the sensor at plot 704, a pumping current output without PCV flow at plot 706 relative to the pumping current output with PCV flow at plot 708.

From t0 to tt5, an engine DFSO event may occur (plot 702). In response to the DFSO event at t0, the reference voltage (Vref) applied to an exhaust gas oxygen sensor may be modulated between a higher voltage (such as 1080 mV) and a lower voltage (such as 450 mV), as shown at plot 704. A pumping current (Ip) output by the sensor in response to the application of the reference voltage may be observed. Plot 706 (darker line) shows the change in pumping current of the exhaust gas oxygen sensor responsive to the modulation of the reference voltage in the absence of any PCV flow, such as when the modulation is performed with the intake throttle open. As shown at 710, in the absence of PCV flow, a smaller change in pumping current (delta Ip 710) is noted wherein delta Ip 710 corresponds to an intake oxygen concentration due to dissociated water molecules. Therefore, an ambient humidity can be inferred from delta Ip 710 during the DFSO condition.

Plot 708 (lighter line) shows the change in pumping current of the exhaust gas oxygen sensor responsive to the modulation of the reference voltage in the presence of PCV flow, such as when the modulation is performed with the intake throttle closed. As shown at 712, in the presence of PCV flow, a larger change in pumping current (delta Ip 712) is noted wherein delta Ip 712 corresponds to an intake oxygen concentration due to dissociated water molecules as well as dissociated CO2 molecules from the oxidation of PCV hydrocarbons at the exhaust oxygen sensor. As can be seen, the presence of PCV flow has a large impact on the output of the sensor, and therefore any humidity estimation performed in the presence of PCV flow, based on delta Ip 712, may incorrectly estimate a higher ambient humidity than an actual ambient humidity. As explained at FIG. 4, delta Ip 712 can be used to learn the PCV flow rate. Specifically, by comparing delta Ip 712 with delta Ip 710, the impact of PCV flow can be learned and the PCV flow can be inferred. Specifically, PCV flow rate can be learned as a function of the difference between delta Ip 712 and delta Ip 710 during the selected DFSO conditions.

At t5, the DFSO condition may end, cylinder fueling may resume, and the output of the sensor may not be used for humidity estimation. As such, during fueling conditions, the output of the exhaust gas oxygen sensor can be used for estimating an exhaust air-fuel ratio (as discussed at FIG. 3) as well as the ethanol content of fuel burned in the engine.

In one example, an engine system comprises an engine with an intake and an exhaust manifold, an exhaust gas oxygen sensor disposed in the exhaust manifold upstream of an exhaust catalyst, an intake throttle disposed in the exhaust manifold, a PCV port configured to deliver blow-by gases from a crankcase of the engine to the intake manifold; and a control system in communication with the sensor. The control system includes non-transitory instructions to: during an engine deceleration fuel shut off (DFSO), close the PCV port; fully open the intake throttle; modulate a reference voltage of the sensor between a first, lower voltage and a second, higher voltage; and generate an indication of ambient humidity based on a first change in pumping current responsive to the modulating of the reference voltage. The controller includes further instructions for, maintaining the PCV port closed; fully closing the intake throttle; re-modulating the reference voltage of the sensor; and generating an indication of PCV flow into the intake manifold based on a second change in pumping current responsive to the re-modulating of the reference voltage relative to the first change in pumping current. Then, during an engine fueling condition following the engine DFSO, the controller may adjust one or more of exhaust gas recirculation, engine air fuel ratio, and spark timing based on the ambient humidity.

In this way, an ambient humidity estimate can be accurately generated by an exhaust gas oxygen sensor during DFSO conditions with minimal impact on the humidity estimate from PCV flow. By closing the throttle during the DFSO conditions when humidity is estimated, PCV flow the engine is reduced, and the hydrocarbon effect of the PCV flow on the sensor output is reduced. During the same DFSO conditions, by modulating the reference voltage of the sensor both with the intake throttle open and with the intake throttle closed, the change in pumping current at the sensor can be advantageously used to learn the PCV flow to the engine. This not only allows PCV flow to be measured, but also enabled early identification of engine component degradation and engine aging leading to leakage of PCV hydrocarbons. One or more engine operating parameters may be then adjusted responsive to the ambient humidity estimate and the PCV flow estimate. As DFSO may occur numerous times during a drive cycle, an ambient humidity measurement may be generated several times throughout the drive cycle and one or more engine operating parameters may be adjusted accordingly, resulting in an optimized overall engine performance despite fluctuations in ambient humidity. Furthermore, the engine operating parameters may be adjusted responsive to the ambient humidity regardless of a duration the engine non-fueling conditions, as an indication of ambient humidity may be generated in a short amount of time even if the exhaust gas is not devoid of residual combustion gases by modulating the reference voltage.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine system, comprising:
   during engine non-fueling conditions, where at least one intake valve and one exhaust valve are operating:
   opening and closing an intake throttle;
   modulating a reference voltage of an exhaust gas sensor with the intake throttle closed and open; and
   indicating engine degradation based on an estimated positive crankcase ventilation (PCV) flow, the PCV flow estimated based on outputs of the sensor during the modulating, wherein the intake throttle is positioned upstream of an exhaust gas recirculation (EGR) inlet of an air intake system of the engine system.

2. The method of claim 1, wherein spark timing is not adjusted during the modulating of the reference voltage of the exhaust gas sensor.

3. The method of claim 1, wherein an air-fuel ratio is not adjusted during the modulating of the reference voltage of the exhaust gas sensor.

4. The method of claim 1, wherein EGR is not adjusted during the modulating of the reference voltage of the exhaust gas sensor.

5. The method of claim 4, wherein opening the intake throttle includes fully opening the intake throttle, and wherein the exhaust gas sensor is an exhaust gas oxygen sensor.

6. The method of claim 4, wherein modulating the reference voltage includes switching the reference voltage between a first, lower voltage and a second, higher voltage.

7. The method of claim 4, wherein the engine non-fueling conditions include a deceleration fuel shut off (DFSO).

8. The method of claim 4, further comprising determining ambient humidity from the exhaust gas sensor, and adjusting the PCV flow and EGR subsequent to determining the ambient humidity.

9. The method of claim 4, wherein indicating engine degradation based on the estimated PCV flow includes indicating engine degradation based on the estimated PCV flow being higher than a threshold.

10. The method of claim 9, wherein modulating the reference voltage of the exhaust gas sensor with the intake throttle closed and open includes first modulating the reference voltage between first and second voltages with the intake throttle open, then closing the intake throttle, and then modulating the reference voltage between the first and second voltages with the intake throttle closed.

11. The method of claim 10, wherein estimating PCV flow based on outputs of the sensor during the modulating includes estimating PCV flow based on a difference between a first change in pumping current output by the sensor during the modulating with the intake throttle open and a second change in pumping current output by the sensor during the modulating with the intake throttle closed.

12. The method of claim 11, further comprising generating an indication of ambient humidity based on an output of the exhaust gas sensor with the intake throttle open.

13. The method of claim 12, further comprising adjusting an engine operating parameter based on the indication of ambient humidity and the estimated PCV flow.

14. The method of claim 13, wherein the engine operating parameter includes an amount of EGR, and wherein the adjusting an amount of EGR includes reducing the amount of EGR responsive to one or more of an indication of higher ambient humidity and an indication of higher than threshold PCV flow.

15. A method for an engine, comprising:
   during a first engine non-fueling condition, opening an intake throttle, modulating a reference voltage of an exhaust gas oxygen sensor, and learning a first change in sensor output during the modulating;
   during a second engine non-fueling condition, closing the intake throttle, modulating the reference voltage of the exhaust gas oxygen sensor, and learning a second change in sensor output during the modulating; and
   generating an indication of positive crankcase ventilation (PCV) flow based on the first change relative to the second change, wherein the throttle is positioned upstream of an exhaust gas recirculation (EGR) inlet of an air intake system of the engine, wherein EGR is not adjusted during the modulating.

16. The method of claim 15, wherein the first change in sensor output is a first change in pumping current output by the sensor during the modulating with the intake throttle open, and wherein the second change in sensor output is a second change in pumping current output by the sensor during the modulating with the intake throttle closed.

17. The method of claim 16, further comprising generating an indication of ambient humidity based on the first change but not the second change in sensor output.

18. An engine system, comprising:
- an engine with an intake manifold and an exhaust manifold;
- an exhaust gas recirculation passage;
- an exhaust gas oxygen sensor disposed in the exhaust manifold upstream of an exhaust catalyst;
- an intake throttle disposed in the intake manifold; and
- a control system in communication with the sensor, the control system including non-transitory instructions for:
  - during an engine deceleration fuel shut off (DFSO),
    - closing a positive crankcase ventilation (PCV) port configured to deliver blow-by gases from a crankcase of the engine to the intake manifold;
    - fully opening the intake throttle;
    - modulating a reference voltage of the sensor between a first, lower voltage and a second, higher voltage;
    - generating an indication of ambient humidity based on a first change in pumping current responsive to the modulating of the reference voltage;
    - maintaining the PCV port closed;
    - fully closing the intake throttle;
    - re-modulating the reference voltage of the sensor; and
    - generating an indication of PCV flow into the intake manifold based on a second change in pumping current responsive to the re-modulating of the reference voltage relative to the first change in pumping current; and
  - during an engine fueling condition following the engine DFSO, adjusting one or more of exhaust gas recirculation, engine air fuel ratio, and spark timing based on the ambient humidity;
- wherein exhaust gas recirculation (EGR) is not adjusted during the modulating.

* * * * *